(12) United States Patent
Zanardi et al.

(10) Patent No.: US 7,775,560 B2
(45) Date of Patent: Aug. 17, 2010

(54) PRESSURE-PULSATION-DAMPING FLUID SUPPLY CONDUIT

(75) Inventors: Mariofelice Zanardi, Turin (IT); Enzo Diciotto, Nichelino (IT)

(73) Assignee: Dayco Fluid Technologies S.p.A., Turin (IT)

( * ) Notice: Subject to any disclaimer, the term of this patent is extended or adjusted under 35 U.S.C. 154(b) by 152 days.

(21) Appl. No.: 11/884,664

(22) PCT Filed: Feb. 21, 2005

(86) PCT No.: PCT/IT2005/000095

§ 371 (c)(1),
(2), (4) Date: May 27, 2008

(87) PCT Pub. No.: WO2006/087746

PCT Pub. Date: Aug. 24, 2006

(65) Prior Publication Data

US 2008/0272589 A1 Nov. 6, 2008

(51) Int. Cl.
*F16L 27/00* (2006.01)
(52) U.S. Cl. .................... 285/280; 285/256; 285/123.2; 285/49; 138/26
(58) Field of Classification Search ................. 285/256, 285/123.2, 280, 275, 272, 924, 49; 138/26, 138/42
See application file for complete search history.

(56) References Cited

U.S. PATENT DOCUMENTS

| 3,818,931 | A | * | 6/1974 | Carpenter | 285/133.11 |
| 3,986,732 | A | * | 10/1976 | Stanley | 285/256 |
| 4,285,534 | A | * | 8/1981 | Katayama et al. | 285/256 |
| 5,201,343 | A | * | 4/1993 | Zimmermann et al. | 138/26 |
| 5,495,711 | A | * | 3/1996 | Kalkman et al. | 138/26 |
| 5,941,283 | A | * | 8/1999 | Forte | 138/26 |
| 6,123,108 | A | * | 9/2000 | Chen et al. | 138/30 |
| 6,158,472 | A | * | 12/2000 | Hilgert | 138/26 |
| 6,866,299 | B2 | * | 3/2005 | Coates | 285/123.2 |
| 7,007,718 | B2 | * | 3/2006 | Chen et al. | 138/26 |
| 7,325,570 | B1 | * | 2/2008 | Krieger | 138/26 |
| 7,347,222 | B2 | * | 3/2008 | Chen et al. | 138/26 |
| 7,380,572 | B2 | * | 6/2008 | Chen | 138/26 |

* cited by examiner

*Primary Examiner*—David E Bochna
(74) *Attorney, Agent, or Firm*—Davidson Berquist Jackson & Gowdey LLP

(57) ABSTRACT

Described herein is a pressure-pulsation-damping fluid supply conduit comprising: a flexible covering pipe, which has end portions opposite to one another; tubular elements having respective first axes and being connected to the end portions; respective couplings, connected to the tubular elements in such a way that they are free to rotate; respective flexible pipes, which have respective fixed portions connected to the respective couplings and respective free portions located radially facing one another.

8 Claims, 1 Drawing Sheet

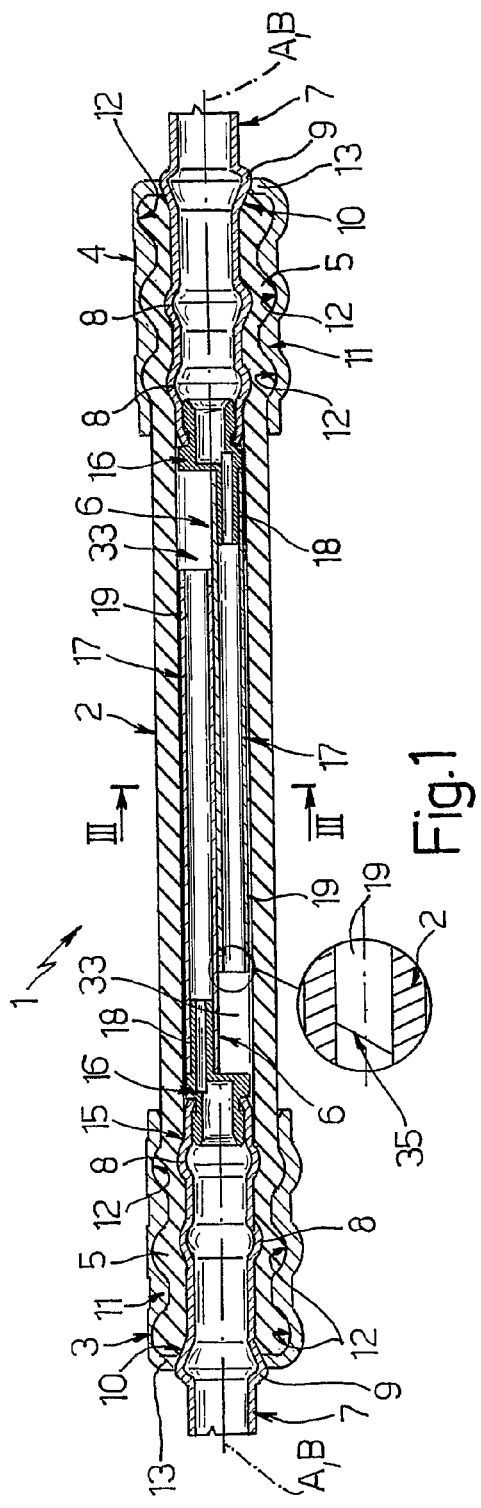
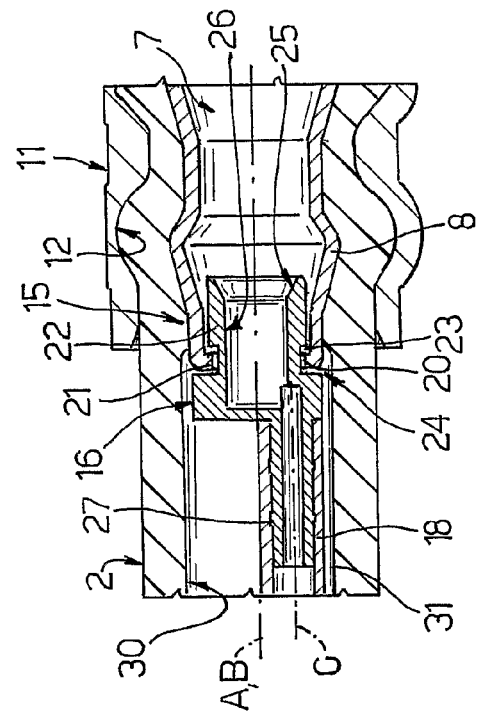
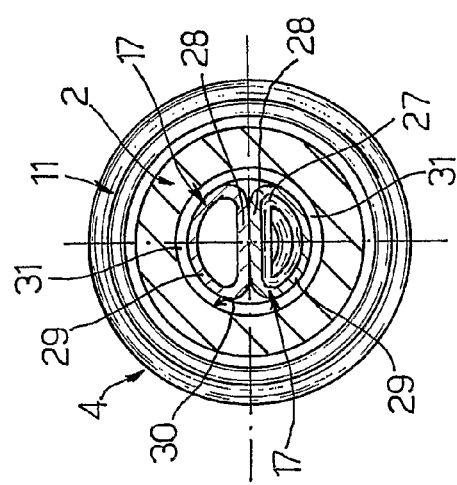

PRESSURE-PULSATION-DAMPING FLUID SUPPLY CONDUIT

TECHNICAL FIELD

The present invention relates to a pressure-pulsation-damping fluid supply conduit and finds a preferred but non-limiting application in a hydraulic power-steering system of a motor vehicle.

BACKGROUND ART

A pressure-pulsation-damping fluid supply conduit for a hydraulic power-steering system generally comprises an external flexible duct, a pair of connection elements arranged at opposite ends of the flexible duct for connecting the duct to a hydraulic power-steering circuit, and a pair of attenuator devices arranged within the external duct.

Each attenuator device comprises a flexible pipe having one end portion connected to the corresponding connection element and one end portion, opposite to the former end portion, extending free within the duct.

The known duct, however, can present problems during installation in so far as the flexible pipes can come up against one another head-on so getting damaged when they are inserted into the external duct. Furthermore, the known duct presents relatively large radial dimensions in order to enable a sufficient damping of the high-intensity pressure pulsations which characterize vehicles of recent production.

DISCLOSURE OF INVENTION

The purpose of the present invention is to provide a pressure-pulsation-damping fluid supply conduit which is free from the drawbacks referred to above.

The purpose of the present invention is achieved via a pressure-pulsation-damping fluid supply conduit as defined in Claim 1.

BRIEF DESCRIPTION OF THE DRAWINGS

For a better understanding of the present invention, there is now described a preferred embodiment thereof, purely by way of non-limiting example, with reference to the attached drawings, in which:

FIG. 1 is a longitudinal cross section of a duct according to the present invention;

FIG. 2 is a longitudinal cross section at an enlarged scale of a detail of FIG. 1; and FIG. 3 is a radial cross-sectional view of the duct of FIG. 1 according to the line III-III of FIG. 1.

BEST MODE FOR CARRYING OUT THE INVENTION

Designated by 1 in FIG. 1 is a pressure-pulsation-damping fluid supply conduit comprising: a multilayer flexible covering pipe 2 designed to be connected along a fluid line of a hydraulic power-steering circuit; connection portions 3, 4, connected, on opposite sides of the external pipe 2, to respective end portions 5 of the covering pipe 2; and a pair of attenuator devices 6 housed inside the covering pipe 2.

Each of the connection portions 3, 4 comprises a tubular element 7, which is housed within the corresponding end portion 5 and has an axis A, and a tightening bell 11, which houses with radial interference the corresponding end portion 5 on the corresponding tubular element 7.

In particular, each tubular element 7 has a pair of annular projections 8, housed inside the end portion 5, and an external annular projection 9, which comes axially out of the corresponding end portion 5 and has a converging side 10 facing the pair of annular projections 8. Accordingly, the tightening bell 11 has three annular grooves 12, two of which are arranged, in use, substantially at the same axial height as the annular projections 8, and a perforated end wall 13, which defines laterally the third annular groove 12 and presents a circular edge which bears upon the converging side 10.

On the opposite side of the converging side 10, each tubular element 7 has an end supporting portion 15, which supports radially and axially the corresponding attenuator device 6.

In particular (see FIG. 2), each attenuator device 6 comprises: a coupling 16, which is obtained via moulding using a composite material having a polyamide matrix and containing fibre-glass fillers and which is connected to the corresponding supporting portion 15; and a flexible pipe 17 made of Teflon, which has a fixed end portion 18 connected to the coupling 16 and a free portion 19, opposite to the connection portion 18, floating within the external pipe 2.

The supporting portion 15 defines a cylindrical housing 20 and comprises a bent end lip 21 facing the axis A. Accordingly, the coupling 16 has a cylindrical element 22, which is housed with radial play within the cylindrical housing 20, and an annular groove 23, which is carried externally by the cylindrical element 22 and houses with axial and radial play the bent lip 21, constraining the coupling 16 axially and further defining an annular port 24 for passage of a working fluid.

The coupling 16 further has a flared inlet portion 25 and a circular cavity 26 defined within the cylindrical element 22 and having an axis B, which, in use, is substantially coaxial to the axis A, and comprises a hollow outlet spout 27, which communicates fluidically with the circular cavity 26 and has an axis C parallel to and located at a distance from the axis B.

In particular (see FIG. 3), the outlet spout 27 is located at a distance from the axis B and has a cross section shaped like the segment of a circle, and moreover mates, with interference fit, with the inside of the fixed portion 18 of the flexible pipe 17. Accordingly, each flexible pipe 17 comprises: a plane wall 28 located partially on top, in a radial direction, of the corresponding wall 28 of the other flexible pipe 17; and a wall 29 shaped like the arc of a circle, which faces, and is radially located at a distance from, an internal surface 30 of the external pipe 2, consequently defining a passage duct 31 shaped like the sector of an annulus.

Consequently, the attenuator devices 6 are identical to one another and are rotated through 180° with respect to one another, and an internal volume of the covering pipe 2 delimited axially by the couplings 16 comprises two side portions 33, occupied only by the respective fixed portions 18, and a portion which is intermediate between the side portions 33 and in which the respective free portions 19 are radially located alongside one another.

Operation of the pressure-pulsation-damping fluid supply conduit 1 is described in what follows.

The fluid coming in from the connection portion 3 reaches the coupling 16 and is split into a main flow, which goes beyond the circular cavity 26 towards the first flexible pipe 17, and a secondary flow, which pass through the annular port 24 and joins up again with the main flow in the internal volume flowing through the duct 31. The silencer structure described hence enables definition of a complex resistive, capacitive and inductive hydraulic impedance.

The energy of the pressure pulsations is basically dissipated passively and reactively according to the following peculiarities:

the fluid flows through a complex path that represents a typically resistive impedance;

the fluid is split into two flows that flow through respective ducts having a different rigidity constituting a typically capacitive impedance; and the propagation front of the pressure pulsations follows a complex path with surfaces of reflection that, being appropriately sized, induce a respective phase delay between the advancing front and the reflected front, thus enabling phenomena of destructive interference.

The appropriate design of the ports that define the main flow and the secondary flow and of the length of the silencers likewise enables a control of the impedance of connection with a hydraulic pump so improving the transfer of energy to an actuator of the hydraulic power-steering circuit.

During installation, the attenuator devices 6 are mounted on the respective tubular elements 7 and are then inserted within the covering pipe 2. When the respective flexible pipes 17 are in head-on contact, the attenuator devices 6 can rotate with respect to one another and located themselves at 180°. Next, the flexible pipes 17 slide with respect to one another, and it is possible to insert the tubular elements 7 into the respective end portion 5 of the covering pipe 2, without any need for centring thereof.

The advantages of the present duct for delivery of a fluid with attenuation of pressure pulsations are described in what follows.

Installation is simplified in so far as the attenuator devices 6 can adapt automatically irrespective of the initial position in which they are inserted within the covering pipe 2. There is moreover reduced the risk of damage that is not controllable because the inside of the duct 1 cannot be inspected after installation of the connection portions 3, 4.

The interaction between the main flow and the secondary flow and the existence of a complex path in the internal volume is extremely efficient and enables a considerable reduction in the axial and radial dimensions.

The cross section shaped like the sector of a circle of the flexible pipes 17 enables an increase in the equivalent hydraulic diameter of the duct itself, thus making possible a simultaneous limitation in the pressure losses and in the radial dimensions of the duct 1 given the same damping action, maintaining wall thicknesses of approximately 1 mm, i.e., thicknesses that can be obtained at low cost and are sufficient to ensure mechanical resistance to flexural vibrations.

The outlet spouts 27 are located out of line with respect to the axis A for further facilitating installation.

The use of a pair of flexible pipes 17 that are partially located on top of one another in the radial direction enables mutual support of the respective free portions 19, so preventing any damage due to flexural vibrations.

Finally, it is clear that modifications and variations can be made to the duct described and illustrated herein, without thereby departing from the sphere of protection of the present invention, as defined in the annexed claims. In particular, the plane wall 28 and the wall shaped like the arc of a circle 29 of the flexible pipes 17 can present a multiplicity of holes for further increasing damping of the pressure fluctuations.

Furthermore, each flexible pipe 17 can initially have a circular cross section and acquire the shape of the segment of a circle only in use once installation has been completed, on account of the radial interference with the free portion 19 of the other flexible pipe 17 within the covering pipe 2.

To facilitate further the installation and in particular the relative rotation for obtaining radial overlapping within the covering pipe 2, the free portions 19 can present an end edge 35 inclined with respect to the axis A, for example by 45°.

It is moreover possible to obtain the coupling 16 so that it is axisymmetrical, thus reducing the costs of production, especially should a metal material be used, in which case it is possible to carry out machining on a lathe.

Alternatively, a concentric outlet spout may be provided on the circular cavity 26, thus further decreasing the head losses.

The invention claimed is:

1. A pressure-pulsation-damping fluid supply conduit comprising: a flexible covering pipe, which has end portions opposite to one another; tubular supporting elements, having respective first axes connected to said end portions; respective couplings connected to said supporting elements; respective flexible pipes, which have respective fixed portions (18) connected to said respective couplings; and respective free portions, which are radially located alongside one another, wherein the couplings are connected to the respective said tubular elements in a freely rotating way.

2. The conduit according to claim 1, wherein the couplings define with the respective said tubular elements respective ports.

3. The conduit according to claim 2, wherein each of said tubular elements comprises an end lip portion bent towards said first axis and in that each of said couplings has an annular groove, which houses, with axial and radial play, said lip portion, so defining one of said ports.

4. The conduit according to claim 1, wherein each of said couplings has a cavity, having a second axis, and an outlet spout, which is connected to said fixed portion and has a third axis located out of line with respect to said second axis.

5. The conduit according to claim 4, wherein the outlet spout has a cross section shaped like the segment of a circle.

6. The conduit according to claim 1, wherein each of said couplings has a cavity having a second axis and an outlet spout connected to said fixed portion and having a third axis, which is parallel with respect to said second axis.

7. The conduit according to claim 1, wherein the flexible pipes have respective cross sections shaped like segments of a circle.

8. The conduit according to claim 1, wherein the free portions have respective edges inclined with respect to said first axis.

* * * * *